United States Patent [19]

Cartier et al.

[11] Patent Number: 4,491,542
[45] Date of Patent: Jan. 1, 1985

[54] ORGANIC FILLER OF ANIMAL ORIGIN TO BE USED IN THE PREPARATION OF FRICTION MATERIALS OFFERING A VERY LOW RATE OF WEAR

[75] Inventors: Michel Cartier, Montbrison; Georges Cros, Saint Etienne, both of France

[73] Assignee: Centre Stephanois de Recherches Mecaniques et Frottement, France

[21] Appl. No.: 431,896

[22] Filed: Sep. 30, 1982

Related U.S. Application Data

[63] Continuation of Ser. No. 136,105, Apr. 28, 1980, abandoned.

[51] Int. Cl.³ .............................. C07G 7/00; C08J 5/14
[52] U.S. Cl. .............................. 260/123.7; 260/112 R; 106/36
[58] Field of Search ............ 106/36; 260/112 R, 123.7

[56] References Cited

U.S. PATENT DOCUMENTS

| | | | |
|---|---|---|---|
| 1,076,325 | 10/1913 | Stinebaugh | 106/36 |
| 1,724,718 | 6/1927 | Laeufer | 106/36 |
| 2,267,913 | 5/1938 | Halstead | 106/36 |

Primary Examiner—John Kight
Assistant Examiner—Garnette D. Draper
Attorney, Agent, or Firm—Remy J. VanOphem

[57] ABSTRACT

The invention pertains to the use of an organic compound of animal origin as a filler in the preparation of compound friction materials.

The fibrous protein type compound has a high content of hydroxyproline. This protein may be used in the fibrous state or in the state of powder. It may be collagen.

This invention applies to the preparation of friction materials offering a very low rate of wear.

7 Claims, No Drawings

ORGANIC FILLER OF ANIMAL ORIGIN TO BE USED IN THE PREPARATION OF FRICTION MATERIALS OFFERING A VERY LOW RATE OF WEAR

This is a continuation of application Ser. No. 136,105, filed Apr. 28, 1980, abandoned.

BACKGROUND OF INVENTION

The invention pertains to the use of an organic filler of animal origin in the preparation of friction materials offering a very low rate of wear.

Reducing the wear of friction elements has always been one of the main concerns of mechanical engineers and in particular when the life and reliability of mechanisms including friction elements have to be improved.

This concern has caused the research to be geared, for a very long time, to the production of materials which can operate with a very low rate of wear while in friction contact with any type of surface (steel, casting or other).

Numerous compounds have been produced to this effect, including metal alloys, sintered materials, plastic materials, etc. More recently, "composite" materials have been developed, in which the master stock (metal, polymer or other) is associated with a filler of variable complexity and consisting of one or several compounds offering various properties: reinforcing property (asbestos, glass or cellulosic fiber for instance), solid lubricant (graphite or molybdenum disulphide, for instance) or other properties such as thermal stabilizer, antioxidant, and the like.

DESCRIPTION OF INVENTION

The present invention pertains to the use of a compound as a filler with any particular matrix metal or polymer. The said compound offers the advantage of conferring outstanding wear properties on the friction material thus obtained. This invention stems from the research conducted by the Applicant in the field of friction applications for organic substances. The invention calls more particularly for a filler of animal origin in the preparation of materials used in the production of friction mechanical elements. The filler comprises fibrous proteins. Examples of fibrous proteins are keratin, myosin, and collagen.

This filler is characterized by the fact that it belongs to the group of the fibrous proteins with a high content of hydroxyproline type amino acid. The proteins of high hydroxyproline content have a level of that amino acid comparable to the level of hydroxyproline found in the collagen present in the conjunctive tissues of animals. As shown in the examples hereinafter, it has been found that the materials which include a substance of the above type offer outstanding wear properties far superior to those of the same materials which do not include the said substance.

Desirably, the invention calls for collagen a fibrous protein substance with a high hydroxyproline content to be incorporated in a wear-resistant friction compound. This particular protein has a high molecular weight and a high hydroxyproline content; it can be found in most animals and represents the main component of the conjunctive tissues. It should be noted that collagen is the fundamental constituent of the frame which maintains the shape of the various organs in the animal organisms, thus playing the same role as the cellulose in vegetal organisms.

According to another characteristic, the filler defined in the invention may be used in itself or associated with such adjuvants as reinforcements, stabilizers, lubricants, coloring agents, antistatic agents, fire retardants, fungicides, softening agents or other mineral and organic products.

The non-exhaustive, following examples give a description of the performance obtained with materials to which the filler described in the invention has been added.

EXAMPLE 1

In this example, the friction test equipment consists of cylindrical shoes which are in contact, through one of their two flat surfaces, with one of the flat surfaces of a rotating cylindrical casting.

The shoes consist of ⅓ copper powder, ⅓ thermosetting resin and ⅓ collagen, these elements having been pressed together at a temperature of 200° C. the thermosetting resin is selected from those thermosetting resins well known in the art, a thermosetting resin being a synthetic resin which solidifies or sets on heating and cannot be remelted.

The wear of the shoes was very low, measuring about 0.4 mm, for a shoe/casting contact sliding velocity of 10 m/sec., a shoe/casting bearing load of 10 bars, and an operating cycle including a stop and go sequence of 20 seconds operation followed by a 5 seconds stop, after 1,000 cycles.

As a comparison, the same experiment conducted with shoes consisting of a resin and copper powder mix, therefore not including the filler of the invention, shows a shoes wear of 1 mm following the same 1,000 test cycles.

EXAMPLE 2

Using the same equipment, in the same conditions as described in the previous example, a comparison has been made of the wear obtained after 1,000 cycles between two materials obtained after compressing a blend including resin, copper powder and abestos fiber; in one case the material did not contain any adjuvant; in the other case, collagen had been added in compliance with the invention. In the second case, the wear of the parts was 4 times lower than the one observed in the first case.

EXAMPLE 3

In similar conditions to those in which the previous tests have been conducted, two heat pressed materials have been compared, respectively consisting of resin + copper powder + asbestos fiber + graphite for the first one, and of resin + copper powder + collagen fiber for the other one; after the same 1,000 cycles the wear amounted to over 1 mm in the first case, and to 0.4 mm only in the second case.

It should be noted that, besides illustrating the remarkable wear properties of the materials containing the filler called for in the invention, this example shows an additional advantage of the invention which can be defined as follows: the composite friction materials presently developed and offering the highest performance, generally include at least two types of filler whose effects are complementary, the first ones conferring acceptable mechanical properties on the material (by acting as a frame for the master stock), but deprived of antiwear properties, the others being designed to confer good friction properties to the material (solid lubricants for instance), but without affecting, if not impairing, its mechanical properties. On the contrary, it may be advantageous to go along with the invention and use only one substance which can play the role of both a reinforcement and an antiwear agent, as a filler.

EXAMPLE 4

These tests have been performed in the same conditions as in the previous examples, but in this case the sliding was continuous instead of using a stop and go sequence. In these conditions:

The shoes made of a material including the filler called for in the invention, including ⅓ resin, ⅓ copper powder and ⅓ collagen can be used in friction during 20 minutes with a very low resulting rate of wear amounting to less than 0.1 mm.

However, the shoes which do not include the substance defined in the invention cannot be used in friction for more than 10 minutes, the wear measuring 4 to 5 mm in this case.

EXAMPLE 5

This test has been conducted in the same conditions as the test described in example 4, using a material which included the filler called for in the invention. Therefore, a hot pressed mixed compound has been used, which consisted of ⅓ resin, ⅓ copper powder and ⅓ bone powder.

It should be noted that the bone powder is used as the filler defined in the invention, since this substance consists mainly of collagen. In these conditions, the rate of wear of the shoes was very low since it did not exceed 0.15 mm after 35 minutes of testing.

EXAMPLE 6

This example concerns shaft/bearing type tests using a 35 C D 4 steel shaft treated for a pressure of 90 hbars, and in friction contact with a bearing of 50 mm diameter and 50 mm length; the sliding velocity measured 7 m/sec. and the pressure 2 bars. Under these conditions, and without any of the lubricants commonly used, the results summarized in the following chart were obtained.

| Nature of the bearing | Test duration | Bearing wear at the end of the test (mm) |
|---|---|---|
| resin filled with polytetrafluoroethylene | 5 minutes | Binding |
| Polyimide resin filled with molybdenum disulphide | | Immediate binding |
| Lead bronze | 1 hour 30 minutes | .6 mm |
| resin filled with leather fiber, to the specifications of the invention | 3 hours (intentional stop) | .05 mm |

We claim:

1. A wear resistant composite friction material consisting essentially of a pressed and bonded mixture of about equal amounts by weight of a thermosetting resin, a copper powder, and an organic substance of animal origin substantially comprising a fibrous protein having a high hydroxyproline content.

2. The invention according to claim 1 wherein said organic substance is incorporated into said friction material as fibers.

3. The invention according to claim 1 wherein said fibrous protein is collagen.

4. The invention according to claim 3 wherein said collagen has been substantially separated from the other constituents of said organic substance.

5. The invention according to claim 1 wherein said organic compound is incorporated into said friction material as a powder.

6. The invention according to claim 5 wherein said powder is bone powder.

7. The invention according to claim 1 wherein said composite material further comprises at least one adjuvant selected from the group consisting of reinforcing agents, stabilizers, lubricants, fire retardant agents, coloring agents, anti-static agents, fungicides, softeners and inert mineral and organic products.

* * * * *